Nov. 5, 1957 — J. B. CURTIS ET AL — 2,812,137
FRUIT COUNTING MACHINE
Filed Feb. 16, 1956 — 2 Sheets-Sheet 1
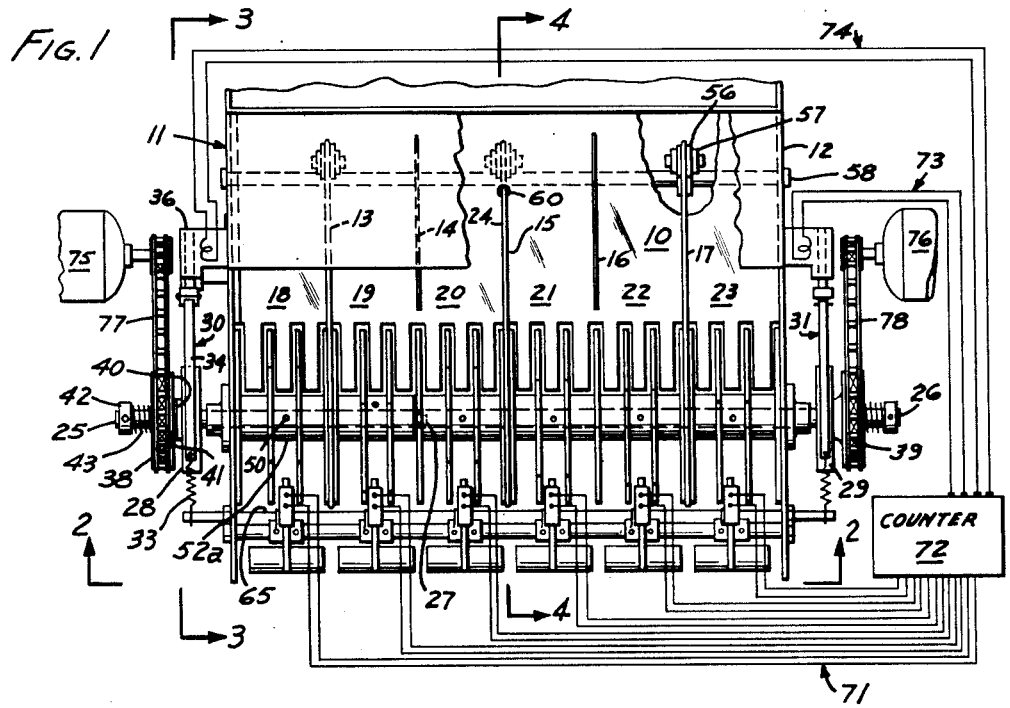
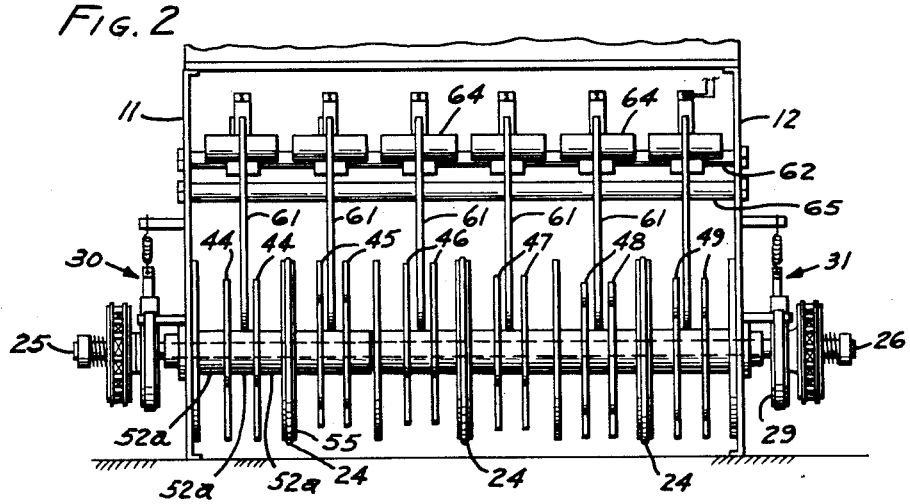
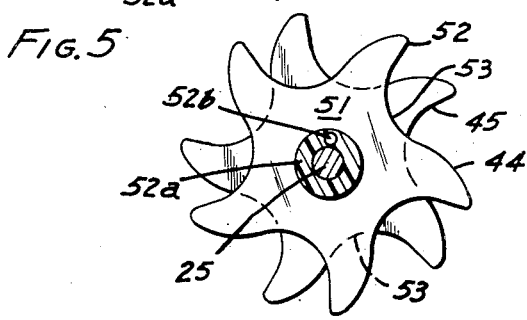
INVENTOR.
JAMES B. CURTIS
CHARLES P. HOSTETLER
BY
D. Gordon Angus
ATTORNEY.

Nov. 5, 1957　　J. B. CURTIS ET AL　　2,812,137
FRUIT COUNTING MACHINE
Filed Feb. 16, 1956　　2 Sheets-Sheet 2

INVENTOR.
JAMES B. CURTIS
CHARLES P. HOSTETLER
BY
D. Gordon Angus
ATTORNEY.

United States Patent Office 2,812,137
Patented Nov. 5, 1957

2,812,137
FRUIT COUNTING MACHINE

James B. Curtis, Yucaipa, and Charles P. Hostetler, Redlands, Calif., assignors to Fruit Equipment Service, Redlands, Calif., a partnership Application February 16, 1956, Serial No. 565,940

4 Claims. (Cl. 235—98)

This invention relates to box filling machinery, and in particular to machinery for placing a counted number of pieces into a box.

Fruits and vegetables, and particularly citrus fruits, are commonly sold in boxes which are required by law to contain a given count of individual pieces. These laws are inflexible and the penalties for short count are high. Therefore it was formerly common practice to fill the boxes by hand to assure an accurate count. The cost of additional labor was often less than the potential penalties.

With increasing labor costs and labor shortages, many packers have resorted to filling these boxes by weight. Since the fruit had to conform to a given size, the total weight of a given count could be ascertained for an average. Filling by weight results in a large saving of labor, since machinery could be designed to rapidly dump fruit into a box, and have its dumping action stopped by a scale-actuated switching means. However, the requirements of an accurate count remain, and it is still possible that a number of pieces of above-average weight could fall into a given box, giving a box of accurate weight but low count. Then a penalty could be exacted by law.

In order to avoid a short count, it has been common practice to raise the weight limit high enough to provide an accurate count uniformly consisting of the heaviest pieces for a given size. Accurate surveys have shown that this results in an average, long-term over-filling of boxes by count of at least 5%. This practice results in the packer giving away 5% of his product, and, even further, it results in 5% less orders from the ultimate customer, since the fruit is purchased by the piece by that customer. Thus this over-filling is doubly disadvantageous in its effect.

Accordingly it is an object of this invention to provide a box filling machine capable of quickly filling a box to a uniformly accurate count, and to eliminate any need for precautionary over-filling of boxes. A further object is to make such a machine which is compact and inexpensive to manufacture.

This invention is carried out in combination with means to feed discreet pieces, such as individual pieces of fruit, to a counting mechanism, said counting mechanism comprising a star wheel. A trip mechanism, actuated by the fruit passed by the star wheel, provides a signal to a counter which, at a predetermined count, stops the feeding action of the star wheel.

According to a preferred but optional feature of this invention, a plurality of power shafts are provided, with at least one star wheel attached to each shaft. Said shafts are separately actuated, and may be run concurrently to furnish a fast counted supply of pieces. When a nearly complete count is supplied, one or more of said shafts may be stopped and fewer shafts run to provide a slower rate of feed. This slower rate of feed may then be more accurately cut off at the completed count than a more rapid rate.

The above and other features of this invention will be fully understood from the following detailed description and the accompanying drawings, of which:

Fig. 1 is a top view partly in cutaway cross-section of a box filling machine according to the invention;

Fig. 2 is a side elevation taken at line 2—2 of Fig. 1;

Fig. 5 is a fragmentary cross-section illustrating a pair of star wheels for feeding pieces into a box.

Figure 3:
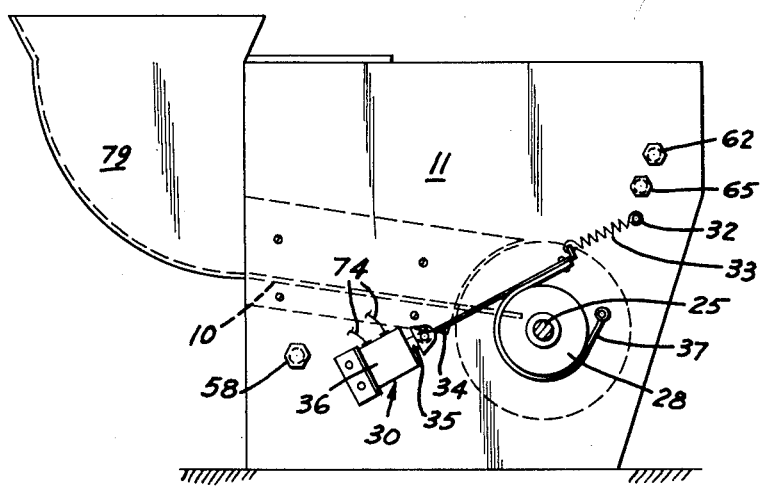
Fig. 3 is a cross-section taken at line 3—3 of Fig. 1.

In Fig. 1, a box filling machine according to the invention is shown with a sloping chute bottom 10, side walls 11, 12 and five chute dividers 13, 14, 15, 16, 17. The side walls and chute dividers form six chutes 18, 19, 20, 21, 22, 23. Chute dividers 14 and 16 are merely stationary baffles, while chute dividers 13, 14 and 17 have driven belts 24 which run along an upper portion of the divider. Some types of fruit, such as lemons, have a long dimension, and the belts tumble the fruit to prevent its jamming in the chute.

Power shaft 25 is journaled in sidewall 11, and power shaft 26 is journaled in sidewall 12. These shafts may be made co-linear, and for mutual support shaft 25 may have a stud 27 which projects into the end of shaft 26. Thus the two shafts are rotatable independently of each other, but give mutual support to their cantilevered free ends.

A brake pulley 28 is keyed to shaft 25 and a similar brake pulley 29 is keyed to shaft 26. These pulleys have smooth outer belt grooves to accommodate a Prony brake. These brakes are the same in their details, so that only brake 30 on shaft 25 will be described in detail. It will be understood that brake 31 on shaft 26 is similar.

An anchor post 32 (see Fig. 3) is fastened to sidewall 11 to serve as an attachment for a coil spring 33. In turn, this spring is fastened to a brake linkage 34 which is connected to the plunger 35 of a solenoid 36. The solenoid is also mounted to sidewall 11, and the brake linkage 34 is therefore suspended beside the sidewall, offset from the power shaft 25. A flexible brake strap 37 is wrapped around part of the periphery of the brake pulley. One end of the strap is fixed to the sidewall 11, and the other end is fastened to the brake linkage 34. This will be recognized as a conventional Prony brake. The brake is spring-loaded on by spring 33 to stop brake pulley rotation. Actuation of the solenoid 36 pulls the brake linkage 34 against the spring to release the brake by loosening strap 37.

Sprockets 38 and 39 are freely rotatable on the end of shafts 25 and 26, respectively, and have a clutch facing 40 bearing against a flat 41 on the brake pulley (see Fig. 1). A collar 42 holds a coil spring 43 compressed against the sprocket, and the sprocket clutch facing is thereby pressed against the flat on the pulley. Sprockets 38 and 39 are driven by motors 75, 76 through chains 77, 78 respectively. The strength of springs 33 and 43 are adjusted so that the shafts 25 and 26 are driven through the sprockets and brake pulleys when the solenoid is actuated to release the brake strap. The shafts are held against rotation by the brake when the solenoid is not actuated, because the spring 33 pulls the brake strap tight. In this latter condition, the brake pulley is held fast, and slippage occurs between clutch facing 40 and flat 41.

Star wheels 44 and 45 are mounted to shaft 25 in chutes 18 and 19, respectively, while star wheels 46, 47, 48 and 49 are disposed in chutes 20-23 respectively. Set screws 50 hold the star wheels tightly to the shafts so that they rotate with the shaft. It will be appreciated that each of the shafts has mounted thereto at least one star wheel which is not driven by another shaft.

Figure 4:
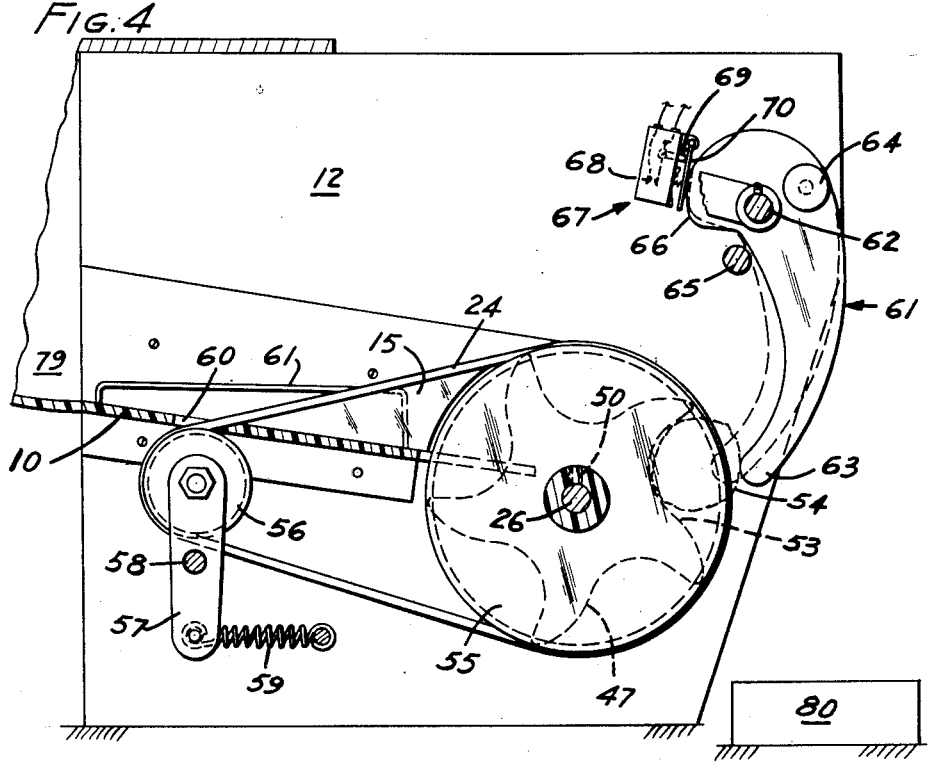
Fig. 4 is a cross-section taken at line 4—4 of Fig. 1.

Fig. 5 shows the pair of star wheels 44, 45 in plan view. The wheels shown are typical of the configuration of all. Each star wheel disc 51 has fingers 52 at the periphery of the wheel which form peripheral cavities 53 for accommodating a piece of fruit, or other object being counted. Each star wheel comprises a pair of discs 51, separated by a spacer 52a. An axial pin 52b joins the two discs and its neighboring spacers 52a. The fingers 52 of the two discs of a single star wheel are aligned so as to grip one piece at a time. Adjacent star wheels have their cavities staggered as shown in Fig. 5 so that fruit is dumped in succession by the star wheels instead of simultaneously by all. In this way the device feeds smoothly, piece by piece, rather than in surges of a plurality of pieces. Fig. 4 shows a piece of fruit 54 in a cavity 53 of a star wheel.

Belts 24 are pulled by the power shafts. A drive pulley 55 is keyed to a power shaft for each one of the belts 24, and the belts are run over these pulleys to idler wheels 56 (see Fig. 4). Idler wheels 56 are journaled to a lever 57 pivoted to a shaft 58 which extends between the sidewalls. A spring 59 attached to the machine structure and to the end of the lever on the other side of shaft 58 from the idler wheel, holds the belt taut. Each belt passes upwardly between the chutes through a hole 60 in the chute bottom 10.

A counting means is provided for counting the fruit or other objects as actually passed by the machine. A rocker arm 61 is provided for each chute, and is freely rotatable on a support 62 held by the sidewalls. This rocker arm has a depending finger 63 which is preferably curved inwardly as shown in Fig. 4 so as to reach into the star wheels cavities when in its lower position shown in dashed line. Biasing means such as a weight 64 is attached to each rocker arm so as to bias the finger toward the cavities. It will be understood that other biasing means, such as springing means and the like, may be used in place of the weight. A bar 65 across the machine comprises a limit stop defining the farthest movement of the finger 63 into the cavities.

Each rocker arm has a cam surface 66 which moves toward and away from a micro-switch 67 as the rocker arm is tilted. Thus, as the piece of fruit 54 in a cavity of the star wheel is moved out of a chute by the star wheel, it contacts the depending finger 63 and moves it counterclockwise as shown in Fig. 4, to the position shown in solid line. The cam surface then makes its closest approach to the microswitch. When the fruit has passed the finger and fallen from the star wheel, the depending finger moves to the position shown in dashed line, and the cam moves away from the microswitch.

The microswitch is conventional, having internal contacts 68, an actuator button 69 for closing said contacts, and a striker plate 70 which is spring-loaded away from the button and on which the cam surface rides. This microswitch is spring-loaded open, although it will be understood that this is a preferred optional feature which could be modified by changing the cam surfaces and switch circuit to provide for using a switch which is spring-loaded closed. An advantage of the circuit as shown is that its repose condition, where there is no fruit in the star wheel cavity in a delivery position, is a no-current condition.

Leads 71 proceed in pairs from each of the microswitches to a counter 72. This counter may comprise a stepping switch pre-set to the desired count. When a piece of fruit or other object is carried by the star wheel, it causes the rocker arm cam to close the microswitch. This provides an impulse to the stepping switch, but does not cause a count, since the fruit will not yet be delivered. When the fruit drops from the star wheel and the depending finger again drops, the breaking of the circuit causes the stepping switch to step one count. Stepping switches and other counting devices for this operation are well known and require no further disclosure here.

The stepping switch is provided with two brake control circuits, one for each brake. A first brake control circuit 73 is connected to the solenoid which actuates brake 31. This circuit is connected to the stepping switch so as to be opened at a count less than the final count and brake the shaft 26. A second brake circuit 74 is connected to the solenoid which actuates brake 30. This second brake control circuit is connected to the stepping switch so as to be opened at the final count and permit brake 30 to be applied at that moment.

A hopper 79 is provided for feeding pieces to the chutes. A box 80, or other container being filled, receives pieces from the star wheels.

The operation of this machine will now be described. Fruit, or other objects to be counted, is dumped into hopper 79. The stepping switch is set for the predetermined count, and if, for example, the count is 100, the switch will be set to open the first brake control circuit 73 at the count of 97, or some other number just short of the desired final count. The switch is also set so that the second brake control circuit 74 will open at the final count of 100.

Motors 75 and 76 are started, and the drive sprockets 38 and 39 are turned by the chains. Since the desired count has not been reached, circuits 73 and 74 are closed and solenoids 36 are actuated to pull the brake linkage 34 against spring 33. This releases the brakes 30 and 31, and permits both shafts 25 and 26 to turn, rotating their star wheels. Fruit will thereupon pass through chutes 18–23, to the star wheels. Each star wheel grasps the fruit a piece at a time in a cavity 53 and conveys it from the chute to drop into the box 80. All six chutes are simultaneously in operation when both brakes are released, and fruit is passed at a relatively high rate.

When a piece of fruit is carried in a star wheel cavity, it first displaces the depending finger 63, and closes the microswitch contacts through the cam surface 66. When the fruit drops out of the cavity, the rocker arm is restored to its rest position against stop 65, and the microswitch is opened, completing a counting pulse. This steps the stepping switch by one count.

It will be noted that the chute ends at the star wheels, and that the star wheel cavities receive pieces of fruit from the chute so as to remove them individually from the chute. Thus, the term "chute" refers to the portion of the star wheels in Fig. 3. Any desired structure could be provided to the right of the star wheels to receive the counted fruit, and said structure could, if desired, be a continuation of chute 10. However, as used herein, the term "chute" relates to the portion of the structure which holds uncounted fruit.

The counter means are actuated by passage of fruit from the cavities. That is, the individual count is completed by passage of a piece of fruit to a point where it is certain to pass free of the star wheels. Thus, the count could even be completed while the piece remains in a cavity, but not until the piece has moved to such a position that its escape is certain. Preferably, the individual count is completed by passage of the freely escaping piece.

After an initial increment of pieces has been delivered, such as the 97 pieces given in the above example, the first brake control circuit 73 is opened by the stepping switch, releasing the solenoid on brake 31. This permits spring 33 to apply this brake 31, and shaft 26 is stopped. Thereafter no pieces will be fed through chutes 20–23. Motor 76 continues to turn sprocket 39, but slippage between the clutch facing 40 and flat 41 allows brake 31 to hold shaft 26 from turning.

However, the second brake control circuit 74 continues to be closed, and brake 30 is still released. Thus pieces are fed through chutes 18 and 19 to the box. The star wheels at chutes 18 and 19 are staggered as shown in Fig. 5, and therefore only one piece passes at a time. With fewer star wheels turning, and these staggered, there is a slower feed rate of pieces, resulting in a quick control of a slower feeding rate at the end of the filling process.

Then the filling process can be stopped immediately when the correct count has been provided. This occurs when the microswitches associated with the rocker arms at chutes 18 and 19 give sufficient pulses to move the stepping switch to a setting corresponding to the predetermined count. The actuation of the braking means is therefore sequential.

At this time, second brake control circuit 74 is opened, solenoid 36 on brake 30 is opened, and brake 30 is applied. Motor 75 continues to turn, but the brake 30 holds shaft 25 against rotation, and slippage results between clutch facing 40 and flat 41.

It is preferable to have the star wheels on each shaft staggered so that a small rotation of either shaft will only cause one or perhaps two pieces to pass through the machine, rather than a higher number, although this is merely a preferable arrangement and not a limitation. It will be recognized that the star wheels on different shafts may be either synchronized or out of synchronization, this being a random effect which depends on the relative shaft speeds as well as their initial relative positions when a box-filling operation is started. The fewer pieces that fall from the star wheels at a given moment, the more accurate is the counting control. In the preferred embodiment fewer pieces should be able to fall at a given moment from star wheels on the shaft which stops first, than there are star wheels on the last shaft to be stopped. In the machine shown in the drawings, therefore, it is preferable that no more than two pieces fall simultaneously from chutes 20–23, there being two star wheels attached to shaft 25, the last-stopping shaft. This assures that there will always be a need for fruit from the later-operating star wheels to complete the total count.

It will be appreciated that the counting means of this invention comprising the rocker arms, microswitches, and stepping switch, cannot give a false count, inasmuch as a counting pulse is not completed until a piece is finally delivered from the machine. The depending fingers of the rocker arm reach into the cavities 53, and are not moved except by contact with a piece.

This counting machine provides a rapid filling operation during the filling of the greater portion of the count, by running fruit through all six chutes. After the major proportion of the count has been supplied, the rate is cut down by feeding through less chutes. Thus this machine provides a box-filling and counting machine and method which provides an optimum filling speed for the greater bulk with means and method for a finishing step of great accuracy.

The machine is simple, inexpensive, and easy to manufacture. Wearing parts, such as the brake straps and clutch facings are accessible and easily replaced. In addition, even simpler counter means may be provided, if desired, such as mechanical ratchet counters and the like, in place of the electrical system shown herein.

Therefore this invention is not to be limited by the embodiments shown in the drawings and described in the description, which are given by way of example and not of limitation, but only in accordance with the scope of the appended claims.

We claim:
1. A machine for providing a counted predetermined number of discreet pieces comprising: a plurality of chutes; a star wheel in each chute, each star wheel having piece-receiving cavities therein, said star wheels being so disposed and arranged in said chutes that pieces are individually received from said chute into said cavities, rotation of said star wheels removes pieces from said chute; a plurality of power means for rotating said star wheels, each of said power means rotating at least one star wheel which is not rotatable by the other of said power means; a plurality of means for interrupting rotation being provided for the star wheels driven by each power means, whereby rotation of the star wheels driven by one power means may be interrupted independently of the star wheels driven by another power means; counter means actuated by passage of pieces from said cavities said counter means being operably connected to said means for interrupting rotation so as to actuate them sequentially.

2. A machine for providing a counted predetermined number of discreet pieces comprising: a plurality of chutes; a star wheel in each chute, each star wheel having piece-receiving cavities therein, said star wheels being so disposed and arranged in said chutes that pieces are individually received from said chute into said cavities, rotation of said star wheels removes pieces from said chute; a plurality of power means for rotating said star wheels, each of said power means rotating at least one star wheel which is not rotatable by the other of said power means; a plurality of braking means for braking the rotation of said star wheels, a braking means being provided for the star wheels driven by each power means, whereby the star wheels driven by one power means may be braked independently of the star wheels driven by another power means; counter means actuated by passage of pieces from said cavities said counter means being operably connected to said braking means to actuate the same sequentially.

3. Apparatus according to claim 2 in which each star wheel is mounted to a shaft, there being an equal number of shafts and power means, each power means being operatively connected to only one shaft, each of said power means including a power rotated member in frictional driving engagement with said shaft, said braking means comprising a Prony brake on said shaft adapted to restrain the shaft from rotation when applied, and including means for applying and means for releasing said Prony brake, said counter means actuating one of said last-two mentioned means.

4. Apparatus according to claim 3 in which the counter means comprises a pivotally mounted rocker arm, a depending finger on said rocker arm so disposed and arranged as to enter said cavities so as to be displaced from said cavities when a piece is moved thereby, a switch, a cam surface on said rocker arm for actuating said switch so as to provide a counting pulse in response to movement of said rocker arm by a piece, and in which the counter means includes a stepping switch actuated by said pulses and connected to said braking means.

References Cited in the file of this patent
UNITED STATES PATENTS

| | | |
|---|---|---|
| 1,987,873 | Scheu et al. | Jan. 15, 1935 |
| 1,992,841 | Rosen | Feb. 26, 1935 |
| 2,632,588 | Hoar | Mar. 24, 1953 |